United States Patent [19]

Masuda et al.

[11] Patent Number: 4,509,155
[45] Date of Patent: Apr. 2, 1985

[54] CIRCUIT ARRANGEMENT FOR A DISK PLAYER FOR REPRODUCING INFORMATION PRERECORDED IN THE FORM OF PITS

[75] Inventors: Isao Masuda, Sagamihara; Kazunori Nishikawa, Machida; Yoshiki Iwasaki, Yokohama; Makoto Komura, Tokyo, all of Japan

[73] Assignee: Victor Company of Japan, Limited, Japan

[21] Appl. No.: 383,258

[22] Filed: May 28, 1982

[30] Foreign Application Priority Data

Jun. 1, 1981 [JP] Japan .................. 56-84191

[51] Int. Cl.³ .............. G11B 15/02; G11B 7/00
[52] U.S. Cl. ............................ 369/48; 369/61
[58] Field of Search .............. 360/30, 65; 369/48, 369/61, 62; 358/166, 342, 315, 316, 318, 327, 35, 37; 455/235, 242, 249

[56] References Cited

U.S. PATENT DOCUMENTS

| 3,310,745 | 3/1967 | Deasy et al. .............. 455/242 |
| 3,643,013 | 2/1972 | Lemoine .................. 360/65 |
| 3,862,355 | 1/1975 | Guisinger ................. 360/64 |
| 3,906,152 | 9/1975 | Hoogendijk . | |
| 4,165,495 | 8/1979 | Takahashi ................ 360/65 |
| 4,414,668 | 11/1983 | Iwasaki ................... 358/336 |

FOREIGN PATENT DOCUMENTS

| 113136 | 9/1980 | Japan ...................... 369/48 |
| 1495784 | 12/1977 | United Kingdom . | |
| 2061072 | 5/1981 | United Kingdom . | |

Primary Examiner—Raymond F. Cardillo, Jr.
Assistant Examiner—Paul Stefanski
Attorney, Agent, or Firm—Lowe, King, Price & Becker

[57] ABSTRACT

In a circuit arrangement for a disk player of the type arranged to reproduce information prerecorded in the form of pits, a variable gain circuit for changing the frequency characteristic of the reproduced signal is provided. The level of the reproduced signal is detected at high and low frequencies so as to produce a control signal the voltage of which varies in accordance with the difference between the level of the high frequency signal component and the level of the low frequency component. The control signal is then applied to the variable gain circuit receiving the reproduced signal so that the frequency characteristic of the reproduced signal will be controlled. Thus, the level of the reproduced signal is boosted at its high frequency range.

6 Claims, 6 Drawing Figures

CIRCUIT ARRANGEMENT FOR A DISK PLAYER FOR REPRODUCING INFORMATION PRERECORDED IN THE FORM OF PITS

BACKGROUND OF THE INVENTION

The invention relates generally to a disk player used for reproducing various information from a disk in which the information has been prerecorded in the form of pits on spiral or coaxial tracks.

Recently, disks have been developed in which video and/or audio signals or the like are recorded as the intermittence of pits after converting the signal into a PCM signal, and then frequency modulating the PCM signal. In apparatus for reproducing a frequency modulated (FM) signal from such disks, the frequency modulated signal picked up by a pickup stylus is frequency demodulated to restore the original video or audio signal.

Generally speaking, in audio disks having a digital signal train, bit rate is relatively great, for instance, 6 Mbit/sec, and the frequency spectrum of the recording signal is of wide range. Therefore, when a signal having such a wide frequency spectrum is frequency modulated, the modulation index lowers especially in connection with high frequency components so that high S/N cannot be obtained.

On the other hand, with such a disk, since reproduction is effected with the rotational speed kept constant irrespective of the radial position of the pickup device, the relative linear velocity between the pickup stylus and the disk at the outer portion (first 45 minutes or so in a disk having a reproducing time length of 60 minutes per one side) is greater than that at the inner portion (last 15 minutes or so in the same disk). Therefore, the level of high frequency components decreases as reproducing the inner portion of a disk, because of the reason that the modulation index of the above-mentioned high frequency components lowers, and the reason that the linear velocity at the inner portion is small. Particularly, at the inner portion, the carrier to noise ratio of the FM signal lowers so that the level of a reproduced signal derived from the pickup lowers from the level of the original recorded signal especially at high frequencies.

For this reason, since a circuit for compensating for the level decrease of the high frequency components on reproduction at the inner portion has not been provided in conventional circuit arrangements for reproducing apparatus, distortion occurs in the output signal of a demodulator responsive to such a reproduced signal. As a result, distinguishment of reproduced data becomes difficult, resulting in errors in codes, and therefore, there is a drawback in that a signal cannot be correctly reproduced throughout the entire disk.

SUMMARY OF THE INVENTION

The present invention has been developed in order to remove the above-described drawback inherent to the conventional disk player or disk reproducing apparatus.

It is, therefore, an object of the present invention to provide a circuit arrangement for a disk player which is capable of reproducing uniformly and correctly the data or information prerecorded in a disk throughout the entire areas of the disk.

According to a feature of the present invention the level of the reproduced signal is detected at high and low frequencies so as to produce a control signal the voltage of which varies in accordance with the difference between the level of the high frequency signal component and the level of the low frequency component. The control signal is then applied to a variable gain circuit receiving the reproduced signal so that the frequency characteristic of the reproduced signal will be controlled. With this arrangement, the level of the reproduced signal is boosted at its high frequency range.

In accordance with the present invention there is provided a circuit arrangement for a disk player of the type arranged to reproduce information prerecorded in a disk in the form of pits, where the information has been recorded as a demodulated signal obtained by modulating a carrier wave, the circuit arrangement comprising: first means responsive to both a lower sideband signal and an upper sideband signal of a reproduced signal from the disk, for producing a control signal indicative of the difference between the levels of the lower sideband signal and the upper sideband signal; and second means for changing the frequency characteristic of the reproduced signal in accordance with the control signal.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE PREFERRED EMBODIMENTS

Prior to describing the embodiments of the present invention, the above described drawback inherent to the conventional circuit arrangement will be discussed for a better understanding of the present invention with reference to FIGS. 1 and 2.

Figure 1:
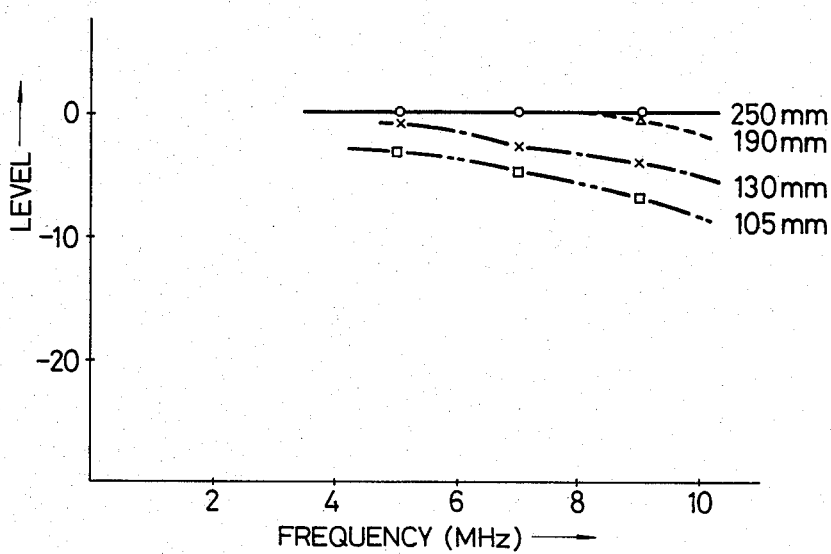
FIG. 1 is a graph showing the relationship between the level of an output signal from a pickup of a disk player, where the radial position of the pickup stylus is used as the parameter.
Figure 2:
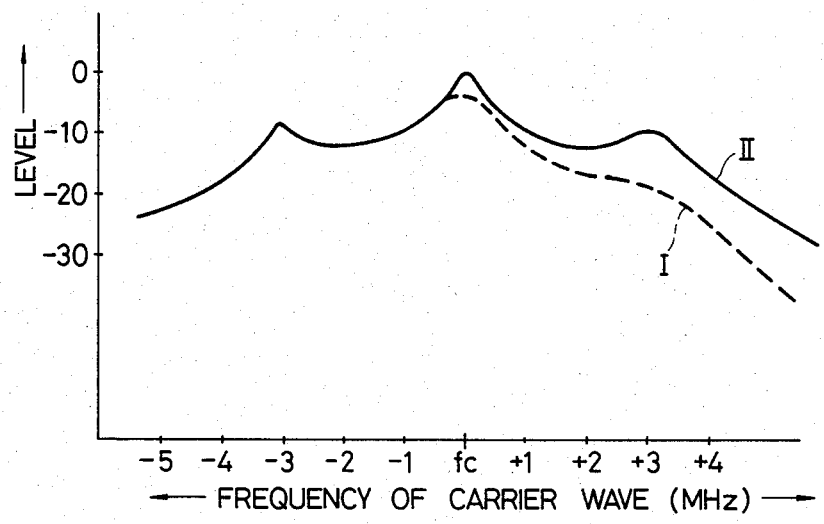
FIG. 2 is a frequency vs level characteristic diagram of a reproduced signal from a disk in comparison with the same characteristic of the original recording signal.

FIG. 1 is an output level vs frequency characteristic diagram with a parameter of the pickup positon on a disk. Four curves are shown in the graph of FIG. 1 where the uppermost curve indicated at 250 mm represents the frequency characteristic obtained when the reproducing stylus is located at the outermost portion of a disk, while the lowermost curve indicated at 105 mm represents the frequency characteristic obtained when the reproducing stylus is located at the innermost portion of the same. It will be understood from this graph that the level or amplitude of the reproduced signal lowers as the pickup stylus moves inside the disk, while the level of higher frequency is lower than that of lower frequency especially when the stylus is located in the vicinity of the innermost portion of the disk. Because of the above-described phenomenon, carrier to noise ratio decreases when reproducing the inner portion of a disk, and therefore, as shown in FIG. 2, the level of the reproduced signal (dotted curve I) lowers from a desired level curve (solid curve II) corresponding to the original recording signal.

Figure 3:
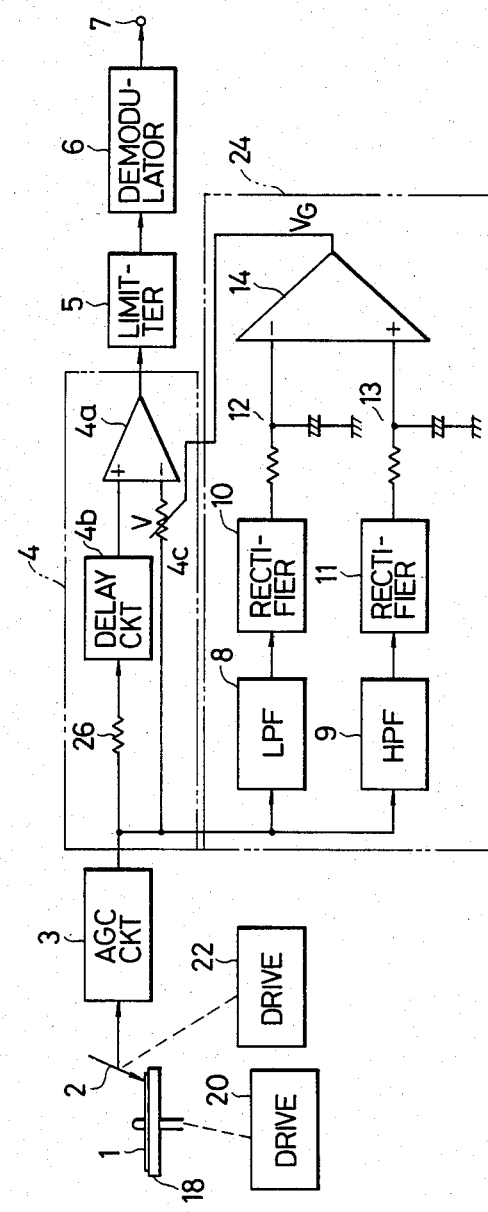
FIG. 3 is a circuit diagram of an embodiment of the present invention.

Refererring now to FIG. 3, a schematic block diagram of an embodiment of the circuit arrangement according to the present invention is shown. The circuit of FIG. 3 comprises an AGC circuit 3, a limitter 5 and a demodulator 6 in the same manner as in the conventional circuit for a disk player. An audio disk 1, which will be described later, is arranged to be rotated on a turntable 18 driven by a turntable drive mechanism 20 so that the disk 1 rotates at a constant rotational speed. A pickup stylus 2 is arranged to move linearly from the outer portion of the disk 1 toward the inner portion of the same or vice versa by means of a pickup drive mechanism 22. These drive mechanisms 20 and 22 as well as the conventional circuits 3, 5 and 6 are well known, and thus further description thereof is omitted. In the above, the outer and inner portions of the disk respectively mean a portion close to the periphery and a portion close to the center of the disk 1.

The circuit arrangement of FIG. 3 comprises, in addition to the above-mentioned circuits, a cosine equalizer 4 connected between the AGC circuit 3 and the limitter 5, and a control voltage producing circuit 24. The cosine equalizer 4 is responsive to the output signal from the AGC circuit 3 to change the amplitude of the same in accordance with a control voltage $V_G$ from the control voltage producing circuit 24. In detail, the cosine equalizer 4 comprises a resistor 26, a delay circuit 4b, a variable resistance element 4c, and a video amplifier 4a functioning as an adder or subtractor. A varistor may be used as the variable resistance element 4c so that the resistance thereof will be controlled in accordance with the control voltage $V_G$. The resistor 26 and the delay circuit 4b is connected in series to be responsive to the output signal from the AGC circuit 3, where the output terminal of the delay circuit 4b is connected to a noninverting input terminal (+) of the adder 4a. The variable resistance element 4c is connected between the output terminal of the AGC circuit 3 and the inverting input terminal (−) of the adder 4a.

The control voltage producing circuit 24 comprises a low pass filter 8, a high pass filter 9, first and second rectifiers 10 and 11, first and second integrators 12 and 13, and a differential amplifier 14. The low pass filter 8, the first rectifier 10 and the first integrator 12 constitute a series circuit, while the high pass filter 9, the second rectifier 11 and the second integrator 13 constitute another series circuit. Each of these series circuits is responsive to the output signal from the AGC circuit 3 so that two D.C. voltages are respectively applied to input terminals of the differential amplifier 14.

This embodiment of FIG. 3 has a feature in that the amount of emphasis at high frequencies is made large by increasing the gain of the cosine equalizer 4 on reproduction especially at the inner portion of the disk 1 because the frequency characteristic of the cosine equalizer 4 is variable in accordance with the level difference between the upper sideband and the lower sideband of the frequency modulated signal reproduced from the disk 1.

The audio disk 1, from which prerecorded information or data is to be reproduced by the circuit arrangement of FIG. 3, comprises unshown pits spirally or coaxially arranged thereon. An audio signal has been recorded in the disk 1, when manufacturing the same, after converting an audio signal into a PCM signal first, and then the PCM signal is further frequency modulated.

When reproducing the prerecorded information from the disk 1 by means of the pickup stylus 2 from the outer portion of the disk 1, the intermittence of pits are derived as the variation in electrostatic capacitance, and thus a sinusoidal wave signal corresponding to this variation will be developed across the pickup output terminals. The sinusoidal wave signal is applied via the AGC circuit 3 and the cosine equalizer 4 to the limitter 5 so that a rectangular wave signal corresponding to the sinusoidal wave signal is produced. The rectangular wave signal is fed to the demodulator 6 to be demodulated therein in a well known manner, so that a train of digital signals is derived from an output terminal 7. The demodulated signal at the output terminal 7 will be converted into a PCM signal by an unshown circuit and then the PCM signal will be converted into the original audio signal by an unshown D/A converter.

The aforementioned cosine equalizer 4 and the control voltage producing circuit 24 operate as follows: The cutoff frequency of each of the low pass and high pass filters 8 and 9 is arranged so that the low pass and high pass filters 8 and 9 are respectively responsive to the lower sideband signal and the upper sideband signal of the signal from the AGC circuit 3. In the preferred embodiment, the cutoff frequency of each of the filters 8 and 9 is set to the frequency of the carrier wave. Therefore, the lower sideband signal and the upper sideband signal are respectively fed to the first and second rectifies 10 and 11. The signals respectively rectified are then applied to the first and second integrators 12 and 13 in which two D.C. voltgages respectively representing the levels of the respective sidebands will be produced. These two D.C. voltages are respectively applied to two input terminals of the differential amplifier 14 so that an output voltage corresponding to the difference between the two D.C. voltage will be developed at the output terminal of the differential amplifier 14. This output voltage from the differential amplifier is used as the aforementioned control voltage $V_G$.

When reproducing the outer portion of the disk 1, level variations hardly occur in both the low frequencies and high frequencies, as described in the above, and accordingly, there is little difference between the level of the lower sideband signal from the low pass filter 8 and the level of the upper sideband signal from the high pass filter 9. Therefore, the control voltage $V_G$ derived from the differential amplifier 14 is small. As a result, the variation range of the variable resistance element 4c of the cosine equalizer 4 is small, and thus the frequency characteristic of the cosine equalizer 4 is substantially constant.

Figure 4:
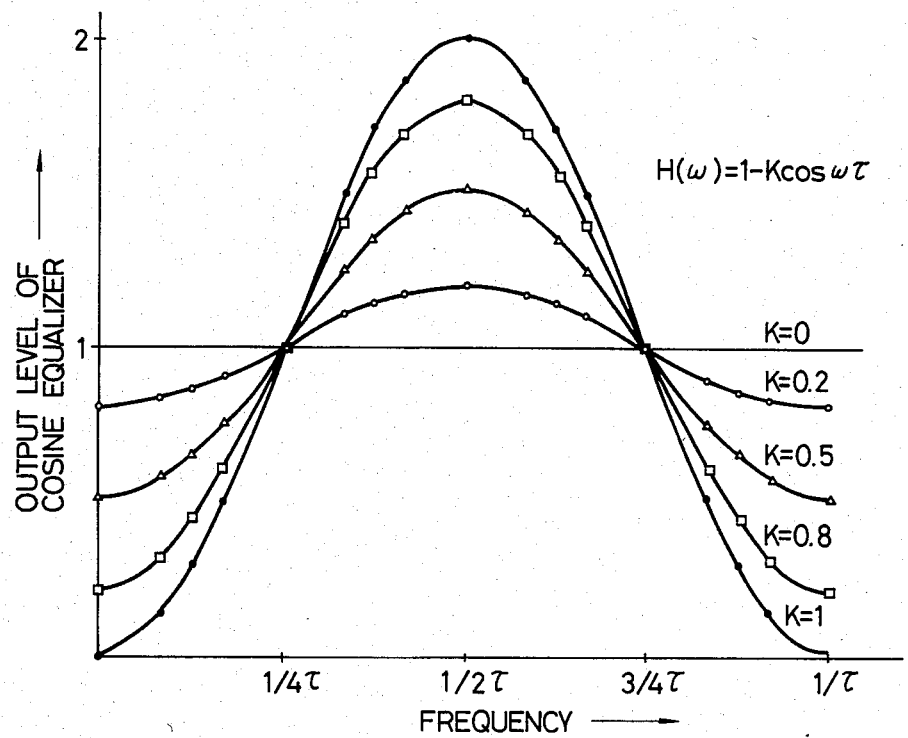
FIG. 4 is a frequency vs level characteristic diagram of the cosine equalizer shown in FIG. 3.

On the other hand, as reproducing the inner portion, the level of the signal from the AGC circuit 3 at the high frequencies lowers, as described above, so that the difference between the level of the lower sideband signal and the level of the upper sideband signal becomes large, and therefore, the control voltage $V_G$ from the differential amplifier 14 becomes larger and larger causing the variable resistance element 4c to decrease its resistance. As a result, the gain of the cosine equalizer 4 increases. For this reason, the output level of the cosine equalizer 4 increases especially at a high frequency range as the increase of a gain variation constant K (the output control voltage $V_G$ of the differential amplifier 14) in a range of frequencies $\frac{1}{4}\tau$ and $\frac{1}{2}\tau$ as shown in FIG. 4. In FIG. 4, the reference $\tau$ is the delay time retarded by the delay circuit 4b, and it is assumed that the transfer function of the cosine equalizer 4 is expressed by $H(\omega) = 1 - K \cos \omega\tau$. With the increase in level, it is possible to correct the level at high frequencies, which tends to lower as reproducing the inner portion of the disk 1.

Checking the output of the AGC circuit 3, reproduction from the outer and inner portions makes a difference of 2 dB in connection with the lower sideband and a difference of 6 to 10 dB in connection with the upper sideband.

Figure 5:
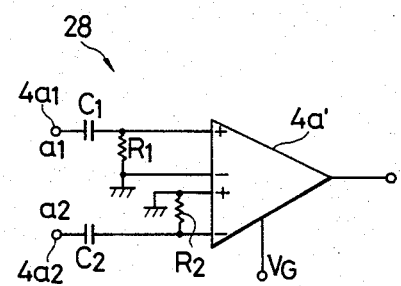
FIG. 5 is a circuit diagram of a variable gain amplifier which is used in another embodiment of the present invention.

FIG. 5 shows a circuit diagram of another embodiment of the present invention. In this embodiment, the combination of the variable resistance element 4c and the adder 4a having two input terminals is replaced with a variable gain amplifier 28 having two capacitors $C_1$ and $C_2$, two resistors $R_1$ and $R_2$ and an adder $4a'$ having four input terminals. As the adder $4a'$ may be used an integrated circuit MC 1445 (wide band video amplifier) manufactured by Motorola. The adder $4a'$ has a control terminal for receiving a voltage with which the gain of the amplifier therein is controlled. The circuit of FIG. 5 has two input terminals $4a_1$ and $4a_2$ which are respectively connected to the output terminal of the delay circuit 4b and the output terminal of the AGC circuit 3 of FIG. 3. The output terminal of the adder $4a'$ is connected to the input terminal of the limiter 5. The control terminal of the adder $4a'$ is connected to the output terminal of the differential amplifier 14 to receive the control voltage $V_G$.

Figure 6:
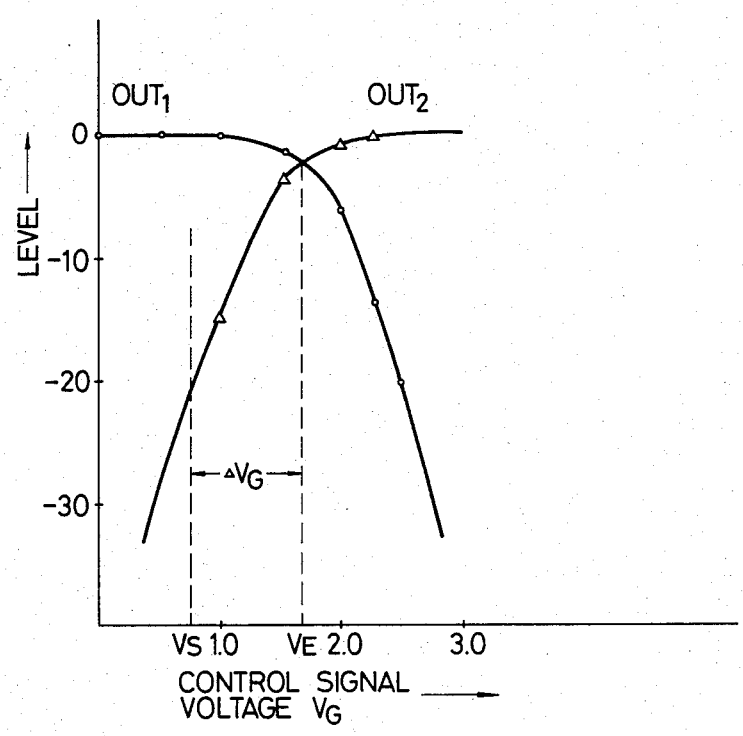
FIG. 6 is a graphical representation useful for understanding the operation of the circuit of FIG. 5.

The variable gain amplifier 28 used in place of the variable resistance element 4c and the adder 4a of the cosine equalizer 4 of FIG. 3 has a characteristic as shown in FIG. 6 showing the relationship between the control voltage $V_G$ and the output level characteristic. In the graph of FIG. 6, the reference $OUT_1$ indicates the output voltage level corresponding to an input signal $a_1$ applied to the input terminal $4a_1$, while another reference $OUT_2$ indicates the output voltage level corresponding to an input signal $a_2$ applied to the input terminal $4a_2$. The references $V_S$ and $V_E$ respectively indicate the values of the control voltage $V_G$ respectively applied when the pickup stylus 2 is at the outer portion and at the inner portion of the disk 1. From FIG. 6, it will be understood that the level of the output signal from the adder $4a'$ corresponding to the input signal $a_1$ slightly lowers as the pickup stylus 2 linearly moves from the outer portion to the inner portion, while the level of the same corresponding to other input signal $a_2$ is made higher and higher as the pickup stylus 2 moves in the same manner. Since the two input signals $a_1$ and $a_2$ are respectively combined with each other by the adder $4a'$, the resultant output signal level at the adder $4a'$ increases in accordance with the increase in the control voltage $V_G$. The reference $\Delta V_G$ in FIG. 6 indicates the difference between the values of $V_E$ and $V_S$. In order that the variable gain amplifier 28 of FIG. 5 functions in a desired manner as shown in FIG. 6, the control voltage producing circuit 24 of FIG. 3 is designed to produce the control voltage $V_G$ which is variable as much as $\Delta V_G$ depending on the position of the pickup stylus 2.

The signal to be recorded in a disk is not limited to a frequency modulated signal of a PCM signal as in the above-described embodiments, and therefore, a signal of other modulations such as MFM or ZM may also be used.

In the above-described embodiments, although a cosine equalizer is used for changing and therefore boosting the amplitude of the high frequency components of the reproduced signal, other circuit may be used for effecting similar results. For instance, an amplifier having a transistor whose emitter is connected to a by-pass condenser may be equipped with a CR circuit so that the time constant of the CR circuit can be changed. Alternatively, a circuit constructed of L, C and R may be employed where the resistance of the R element is variable.

From the foregoing it will be understood that the level of the signal applied to the limiter 5 is satisfactorily controlled irrespective of the radial position of the pickup stylus 2 on the disk 1. Therefore, the information carried by the pits of the disk 1 can be accurately detected throughout the entire surface of the disk 1 even if the linear velocity between the pickup stylus and the pits varies due to the constant rotational speed of the disk 1. Consequently, it is possible to obtain a demodulated or decoded signal uniformly throughout the entire disk including the outer portion and the inner portion, and thus a correct reproduced signal can be obtained without suffering from code errors.

The above-described embodiments are just examples of the present invention, and therefore, it will be apparent for those skilled in the art that many modifications and variations may be made without departing from the spirit of the present invention.

What is claimed is:

1. A circuit arrangement for a disk player of the type arranged to reproduce information prerecorded in a disk in the form of pits, where said information has been recorded as a modulated signal obtained by modulating a carrier wave, said circuit arrangement comprising:
    (a) first means responsive to both a lower sideband signal and an upper sideband signal of a reproduced signal from said disk, for producing a control signal indicative of the difference between the levels of said lower sideband signal and said upper sideband signal; and
    (b) second means for changing the frequency characteristic of said reproduced signal in accordance with said control signal.

2. A circuit arrangement as claimed in claim 1, wherein said first means comprises:
    (a) a low pass filter responsive to said reproduced signal;
    (b) a high pass filter responsive to said reproduced signal;
    (c) a first rectifier responsive to the output signal from said low pass filter;
    (d) a second rectifier responsive to the output signal from said high pass filter;
    (e) a first integrator responsive to the output signal from said first rectifier for producing a first D.C. voltage;
    (f) a second integrator responsive to the output signal from said second rectifier for producing a second D.C. voltage; and
    (g) a differential amplifier responsive to the output signals from said first and second integrators for producing said control signal indicative of the difference between the levels of said first and second D.C. voltages.

3. A circuit arrangement as claimed in claim 1, wherein said second means comprises a cosine equalizer whose frequency characteristic is variable in accordance with said control signal.

4. A circuit arrangement as claimed in claim 3, wherein said cosine equalizer comprises;
   (a) a delay circuit;
   (b) a variable resistance element arranged to be controlled by said control signal; and
   (c) an adder responsive to the output signal from said delay circuit and to the output signal from said variable resistance element.

5. A circuit arrangement as claimed in claim 3, wherein said cosine equalizer comprises;
   (a) a delay circuit; and
   (b) a variable gain amplifier responsive to the output signal from said delay circuit and to said reproduced signal, the gain of said variable gain amplifier being arranged to be controlled by said control signal.

6. A circuit arrangement as claimed in claim 1, further comprising:
   (a) an AGC circuit responsive to said reproduced signal for supplying said first and second means with said reproduced signal;
   (b) a limitter responsive to the output signal from said second means; and
   (c) a demodulator responsive to the output signal from said limiter.

* * * * *